United States Patent Office 3,832,357
Patented Aug. 27, 1974

3,832,357
PROCESS FOR PREPARATION OF 3-HYDROXY-2-ALKYL-4-PYRONE
Masaru Higuchi and Tadashi Yamada, Ohimachi, and Ryoshu Suzuki, Kawagoe, Japan, assignors to Daicel Ltd., Osaka, Japan
No Drawing. Filed May 24, 1972, Ser. No. 256,538
Claims priority, application Japan, May 26, 1971, 46/35,982; Dec. 22, 1971, 46/104,332
Int. Cl. C07d 7/16
U.S. Cl. 260—345.9      12 Claims

ABSTRACT OF THE DISCLOSURE

A process for the preparation of 3-hydroxy-2-alkyl-4-pyrone in which the alkyl is methyl or ethyl, which comprises reacting a β,δ-dioxoaldehyde dialkylacetal in which the aldehyde is selected from caproaldehyde and enanthaldehyde, with an aryl iodosodicarboxylate to form an oxidatively acyloxylated product, subjecting the acyloxylated product to thermal decomposition or treatment with an acidic condensing agent, and hydrolyzing the same successively or concurrently with said thermal decomposition or treatment with an acidic condensing agent.

BACKGROUND OF THE INVENTION

Field of the invention

This invention relates to a process for preparing 3-hydroxy-2-alkyl-4-pyrones.

SUMMARY OF THE INVENTION

According to the invention, there is provided a process for the preparation of 3-hydroxy - 2 - alkyl-4-pyrone in which the alkyl is methyl or ethyl, which comprises reacting a β,δ-dioxoaldehyde dialkylacetal in which the aldehyde is selected from caproaldehyde and enanthaldehyde, with an aryl iodosodicarboxylate to form an oxidatively acyloxylated product, subjecting the acyloxylated product to thermal decomposition or treatment with an acidic condensing agent, and hydrolyzing the same successively or concurrently with said thermal decomposition or treatment with an acidic condensing agent.

For better illustration, the reaction steps in this invention are schematically shown as follows $$RCOCH_2COCH_2CH(OR^1)_2 + R^2I(OCOR^3)_2 \longrightarrow$$
(I)                                    (II)

$$RCOCHCOCH_2CH(OR^1)_2 + R^2I$$
$$\quad\quad |$$
$$\quad OCOR^2$$
(III)

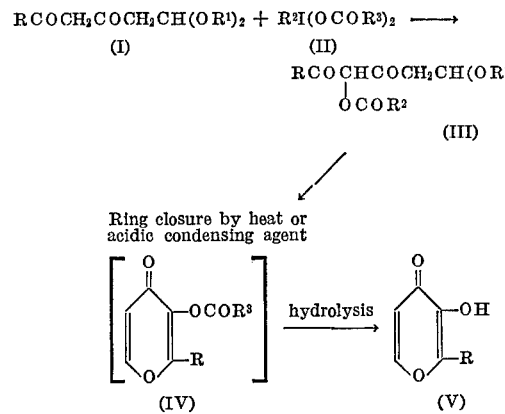

Ring closure by heat or acidic condensing agent $$\begin{bmatrix} \text{OCOR}^3 \\ \text{R} \end{bmatrix} \xrightarrow{\text{hydrolysis}} \begin{matrix} \text{OH} \\ \text{R} \end{matrix}$$

(IV)                                    (V)

wherein R is methyl or ethyl.

The starting substance of the above formula (I) to be used in this invention, that is, β,δ-dioxocaproaldehyde dialkylacetal or β,δ-dioxoenanthaldehyde dialkylacetal, can readily be obtained by the Claisen condensation reaction between a β,β-dialkoxypropionic acid ester and acetone or methylethylketone using a basic catalyst. In the above formula (I) $R^1$ is a lower alkyl group having 1–4 carbon atoms, and alkyl groups of up to 2 carbon atoms are especially preferred. A method using lead tetracetate, which is disclosed in German Pat. No. 1,951,294, has been known as a method of acetoxylating the γ position of β,δ-dioxocaproaldehyde dialkylacetal which is one of the starting substances of formula (I) to be used in this invention. Lead tetracetate which is known to have a property of acetoxylating oxidatively the 2-position of a 1,3-diketone such as a compound of formula (I), however, causes other various oxidation reactions. An aryl iodosodicarboxylate of formula (II), which is a reagent having a reactivity similar to lead tetracetate, is a known substance. Phenyl iodosodiacetate, which is one of compounds expressed by the above formula (II), is reported to react with acetyl acetone and other noncyclic 1,3-diones, which are very similar to the starting substance of formula (I) to be used in this invention, resulting only in the formation of cleavage products without giving any 2-acetoxy compounds (O. Ja. Neiland and G. Ja. Wanag; Chemical Abstracts, 54, 21, 080 (1960), and Chemisches Zentralblatt, 13, 713 (1962)). Thus, it was unexpected that the reaction of the starting substance of formula (I) with a compound of formula (II) would result in the formation of an acyloxylated compound of formula (III), as occurs in this invention. We have discovered, unexpectedly in view of the prior art, a process according to which γ-acyloxy-β,δ-dioxoaldehydedialkylacetals of formula (III) can be obtained in good yields. Thus, we have completed a process for the preparation of 3-hydroxy-2-alkyl-4-pyrone in which the alkyl group is selected from methyl and ethyl groups.

In compounds of formula (II), $R^2$ stands for an aryl group of 6 to 10 carbon atoms and $R^3$ is hydrogen or lower alkyl of 1 to 5 carbon atoms or aryl group of 6 to 10 carbon atoms. In general, as $R^2$ there can be employed substituted benzene derivatives such as phenyl, tolyl and nitrophenyl groups. A phenyl group is especially preferred. Preferred examples of $R^3$ are alkyl groups of up 2 carbon atoms and a phenyl group. The aryl iodosodicarboxylates of formula (II) can easily be synthesized in high yields by reacting an iodoaryl compound such as iodobenzene with an alkyl or aryl organic peracid such as peracetic acid or perbenzoic acid, or by reacting an aryliodoso compound with an organic acid.

In accordance with the process of this invention, the starting substances of formula (I) and (II) first are reacted with each other to form an oxidatively acyloxylated product, γ-acyloxy-β,δ-dioxoaldehyde dialkylacetal of formula (III) in which the aldehyde is selected from caproaldehyde and enanthaldehyde. This reaction may be carried out in a solvent, although the use of a solvent is not essential in this reaction. Halogenated hydrocarbons such as chloroform and carbon tetrachloride and organic acids such as acetic acid and propionic acid are especially preferred as the solvent, but other hydrocarbons and inert solvents such as ethers and esters may be used conveniently without any disadvantages. The amounts and ratios of the starting substances and solvent, and the method of mixing them are not critical, so long as the object of this invention, i.e., the economical preparation of the intended product, can be attained. The reaction temperature is not particularly critical, and the reaction is carried out generally at 0 to 250° C. or higher. But an excessively high temperature is not preferred because other side reactions or decomposition reactions tend to occur. The reaction may be conducted under atmospheric or elevated pressure. It is not absolutely necessary that the starting substance of formula (I) should be employed in the purified form. For instance, a product containing small amounts of impurities, which product is directly recovered from the reaction between a β,β-dialkoxypropionic acid ester and acetone or methylethylketone, which is one of the reactions giving the starting substance of formula (I), may be used in this invention conveniently.

The thus formed acyloxylated product, γ-acyloxy-β,δ-dioxoaldehyde dialkylacetal of formula (III), is thermally decomposed at a temperature of more than 90° C., preferably 150–200° C., or treated with an acidic condensing agent such as hydrochloric acid, phosphoric acid, sulfuric acid or an organic sulfonic acid at a temperature lower than 150° C., preferably 10–100° C. to form a 2-acyloxy-2-alkyl 4-pyrone of formula (IV), which is then hydrolyzed to the corresponding 3-hydroxy-2-alkyl-4-pyrone of formula (V). It is possible to obtain a compound of formula (IV) by treating the acyloxylated product of formula (III) at a temperature exceeding 150° C. in the presence of an acidic condensing agent, but no improved effect can be obtained by such treatment and side reactions tend to occur. Therefore, such treatment is not preferred. The ring closure by the thermal decomposition may be accomplished coincidentally with the distillation under reduced pressure of the acyloxylated product (Formula III) by conducting it at the above temperature. Further, since the 3-acyloxy-2-alkyl-4-pyrone of formula (IV) is hydrolyzed relatively easily, in the thermal decomposition treatment or the acidic condensing agent treatment, the presence of water in such treatment will cause the hydrolysis to occur concurrently, with the result that the intended product of formula (V) can be obtained by one step from the acyloxylated product of formula (III). In this case, it is possible to synthesize the intended product of formula (V) directly from the reaction liquor coming from the acyloxylation reaction without isolation of the acyloxylated product of formula (III) therefrom.

The aryl iodosodicarboxylate of formula (II) used as the oxidative acyloxylation agent leaves an iodoaryl compound ($R^2I$) after the reaction. This can be easily separated by distillation under reduced pressure or filtration after removal of the solvent from the reaction mixture by distillation. The reagent of formula (II) can readily be obtained by reacting the so separated iodoaryl compound ($R^2I$) with an organic peracid. Thus, it may be recycled to the reaction and used repeatedly. Still further, it is possible to react the starting substance of formula (I) with the reaction mixture liquor coming from the above reaction of the iodoaryl compound and an organic acid without isolation of the compound of formula (II) therefrom. Still in addition, it is also possible to conduct the oxidative acyloxylation reaction concurrently while forming the aryl iodosodicarboxylate of formula (II) from the iodoaryl compound, the starting substance of formula (I) and an organic acid. These are some of the advantages of the process of this invention. In addition to the above-mentioned ease of recovery, the process of this invention has a further advantage over the method using lead tetracetate as the oxidative acyloxylation agent. Namely, the acyloxylation agent of formula (II) to be employed in this invention is stable in air, and hence, charging and other operations can be conducted stably in the process of this invention, as compared with the method employing lead tetracetate which is rapidly degraded by moisture in the air.

The intended product, 3-hydroxy-2-alkyl-4-pyrone of formula (V) in which the alkyl group is selected from methyl and ethyl group, is used as a food additive. When this compound is prepared according to the process of this invention, a step for the removal of heavy metals is not necessary. Thus, the process of this invention is also advantageous in that the purification step can be simplified as compared with the conventional method. As detailed hereinabove, the process of this invention can give various substantial advantages when it is practiced on an industrial scale.

The end products of the process of this invention are valuable as agents for improving the flavor and taste of foodstuffs, 3-hydroxy-2-methyl-4-pyrone commonly being called "maltol" and 3-hydroxy-2-ethyl-4-pyrone commonly being called "ethyl maltol." These products have heretofore been derived predominantly from natural substances. This invention provides a process which supersedes such conventional techniques and can give maltol or ethyl maltol of high purity synthetically in high yields. Thus, this invention makes meritorious contributions to the art.

The process of this invention for preparing 3-hydroxy-2-alkyl-4-pyrones will now be illustrated by reference to the following illustrative Examples, but the scope of this invention is not limited by these Examples.

Example 1

29.0 Parts by weight (which will be referred to simply as "parts" hereinbelow) of phenyl iodosodiacetate, 100 parts of acetic acid and 17.4 parts of β,δ-dioxocaproaldehyde dimethylacetal were mixed together, and they were reacted by heating them under agitation for 2 hours at the reflux temperature of acetic acid. After the reaction, acetic acid used as the solvent and iodobenzene formed by the reaction were removed from the reaction mixture by distillation, thereby to obtain a concentrated liquor composed mainly of γ-acetoxy-β,δ-dioxocaproaldehyde dimethylacetal. To the thus formed concentrated liquor was added 50 parts of dilute hydrochloric acid, and the mixture was heated at 100° C. under agitation for 2 hours to effect ring closure and hydrolysis. The resulting liquor was extracted with chloroform and distillation of chloroform gave crude crystals of 3-hydroxy-2-methyl-4-pyrone. When the crude crystals were purified, 5.67 parts of white crystals of 3-hydroxy-2-methyl-4-pyrone were obtained. The infrared absorption spectrum and nuclear magnetic resonance spectrum of the product were quite in accord with those of the standard substance, and the color reaction with iron chloride was positive. Further, a decrease of the melting point was not observed when the product was mixed with the standard substance.

Example 2

6.22 Parts of phenyl iodosodiacetate, 10 parts of propionic acid and 1.74 parts of β,δ-dioxocaproaldehyde dimethylacetal were mixed together, and they were reacted by heating them under agitation for 2 hours in an oil bath maintained at 150° C.

Then, the resulting reaction liquor was treated in the same manner as in Example 1 to obtain 0.402 part of 3-hydroxy-2-methyl-4-pyrone.

Example 3

8.7 Parts of β,δ-dioxocaproaldehyde dimethylacetal and 75 parts of chloroform were heated at 50° C. under agitation, and to the mixture was added 16.1 parts of phenyl iodosodiacetate over a period of 25 minutes. Then, the reaction was carried out at 50° C. for 4 hours. After distillation of the solvent and iodobenzene, the treatment was conducted in the same manner as in Example 1 to obtain 0.98 part of crystals of 3-hydroxy-2-methyl-4-pyrone.

Example 4

10.1 Parts of β,δ-dioxocaproaldehyde diethylacetal, 50 parts of acetic acid and 16.1 parts of phenyl iodosodiacetate were mixed together, and they were reacted for 2 hours at the reflux temperature of acetic acid. The post-treatment was conducted in the same manner as in Example 1 to obtain 3-hydroxy-2-methyl-4-pyrone.

Example 5

14.1 Parts of 27% peracetic acid solution (solvent being a liquid mixture of acetic acid and ethyl acetate) was added at 40° C. to a liquid mixture of 8.7 parts of β,δ-dioxocaproaldehyde dimethylacetal, 10.5 parts of iodobenzene, 75 parts of chloroform and 14 parts of acetic acid, and the reaction was carried out at 40° C. for 7 hours. Ring closure and hydrolysis were accomplished by addition of dilute hydrochloric acid to obtain 0.45 part of 3-hydroxy-2-methyl-4-pyrone.

Example 6

A solution of phenyl iodosodiacetate was prepared by reacting 30 parts of 27% peracetic acid solution, 20.4 parts of iodobenzene, and 42 parts of acetic acid for 1.5 hours. A solution of 17.4 parts of β,δ-dioxocaproaldehyde dimethylacetal in 58 parts of acetic acid was added to the above solution, and the reaction was carried out for 2 hours in a bath maintained at 125–130° C. while distilling a part of the low boiling point solvents. Then, the treatment was conducted in the same manner as in Example 1 to obtain 4.18 parts of 3-hydroxy-2-methyl-4-pyrone.

Example 7

17.4 Parts of β,δ-dioxocaproaldehyde dimethylacetal, 16.1 parts of phenyl iodosodiacetate and 50 parts of acetic acid were reacted at the reflux temperature of acetic acid for 2 hours. After distillation of acetic acid and iodobenzene, thermal decomposition was carried out at 80–130° C. under vacuum of 4 mm. Hg. Thus, in addition to liquid fractions, 3-hydroxy-2-methyl-4-pyrone was sublimated and precipitated to form crystals. The product obtained by purifying the crystals was analyzed and it was found that the product was quite in accord with the standard sample of 3-hydroxy-2-methyl-4-pyrone.

Example 8

1.74 Parts of β,δ-dioxocaproaldehyde dimethylacetal, 3.67 parts of p-nitrophenyl iodosodiacetate and 10 parts of acetic acid were reacted in the same manner as in Example 1, and the post-treatment was carried out in the same manner as in Example 1 to obtain 0.328 part of 3-hydroxy-2-methyl-4-pyrone.

Example 9

1.74 Parts of β,δ-dioxocaproaldehyde dimethylacetal, 3.36 parts of p-tolyl iodosodiacetate and 10 parts of acetic acid were reacted in the same manner as in Example 1 and the post-treatment was carried out in the same manner as in Example 1 to obtain 0.553 part of 3-hydroxy-2-methyl-4-pyrone.

Example 10

1.74 Parts of β,δ-dioxocaproaldehyde dimethylacetal, 4.46 parts of phenyl iodosodipropionate and 10 parts of propionic acid were reacted in the same manner as in Example 1 and the post-treatment was carried out in the same manner as in Example 1 to obtain 3-hydroxy-2-methyl-4-pyrone.

Example 11

1.74 Parts of β,δ-dioxocaproaldehyde dimethylacetal, 4.6 parts of phenyl iodosobenzoate and 10 parts of acetic acid were reacted in the same manner as in Example 1 and the post-treatment was carried out in the same manner as in Example 1 to obtain 3-hydroxy-2-methyl-4-pyrone.

Example 12

18.8 Parts of β,δ-dioxoenanthaldehyde dimethylacetal, 32.2 parts of phenyl iodosodiacetate and 60 parts of acetic acid were heated under agitation and reacted at the reflux temperature of acetic acid for 2 hours.

After the reaction, acetic acid used as the solvent and iodobenzene formed by the reaction were removed from the reaction mixture by distillation to obtain a concentrated liquor composed mainly of γ-acetoxy-β,δ-dioxo-enanthaldehyde dimethylacetal. To the concentrated liquor was added 150 parts of dilute hydrochloric acid, and the mixture was heated at 100° C. under agitation for 2 hours to effect ring closure and hydrolysis. The organic layer was separated, and the water layer was extracted with chloroform. The extract was combined with the organic layer. Chloroform was distilled off and the residual liquor was subjected to distillation under reduced pressure to obtain wet crystals of 3-hydroxy-2-ethyl-4-pyrone, which were then purified by filtration, washing and sublimation to obtain 3.72 parts of white crystals of 3-hydroxy-2-ethyl-4-pyrone melting at 90–91° C. When the product was mixed with the standard sample of ethyl maltol, a decrease in the melting point was not observed. The infrared absorption spectrum and nuclear magnetic resonance spectrum of the product were quite in accord with those of the standard substance, and the color reaction with iron chloride was positive.

Example 13

21.6 Parts of β,δ-dioxoenanthaldehyde diethylacetal, 32.2 parts of phenyl iodosodiacetate and 100 parts of acetic acid were reacted by heating them at the reflux temperature of acetic acid under agitation for 2 hours.

After the reaction, the treatment was carried out in the same manner as in Example 1 to obtain white crystals of 3-hydroxy-2-ethyl-4-pyrone.

Example 14

30 Parts of 27% peracetic acid solution, 20.4 parts of iodobenzene and 40 parts of acetic acid were reacted for 1.5 hours to obtain a solution of phenyl iodosodiacetate, which was then combined with a solution of 21.6 parts of β,δ-dioxoenanthaldehyde dimethylacetal in 60 parts of acetic acid. The reaction was carried out for 2 hours at the boiling point of acetic acid. The subsequent operation was conducted in the same manner as in Example 1 to obtain 3-hydroxy-2-ethyl-4-pyrone.

Example 15

2.16 Parts of β,δ-dioxoenanthaldehyde dimethylacetal, 3.36 parts of p-tolyl iodosodiacetate and 10 parts of acetic acid were reacted in the same manner as in Example 1 to obtain 3-hydroxy-2-ethyl-4-pyrone.

Example 16

4.32 Parts of β,δ-dioxoenanthaldehyde dimethylacetal, 8.92 parts of phenyl iodosodibenzoate and 20 parts of acetic acid were reacted and treated in the same manner as in Example 1 to obtain 3-hydroxy-2-ethyl-4-pyrone.

Example 17

4.32 Parts of β,δ-dioxoenanthaldehyde dimethylacetal, 7.00 parts of phenyl iodosodipropionate and 20 parts of propionic acid were reacted and treated in the same manner as in Example 1 to obtain 3-hydroxy-2-ethyl-4-pyrone.

Example 18

21.6 Parts of β,δ-dioxoenanthaldehyde dimethylacetal, 32.2 parts of phenyliodosodiacetate and 100 parts of acetic acid were mixed together, and they were reacted under agitation for 2 hours at the reflux temperature of acetic acid. After distillation of acetic acid and iodobenzene, the thermal-decomposing distillation was conducted under reduced pressure at 160–180° C. In addition to liquid fractions, 3-hydroxy-2-ethyl-4-pyrone was sublimated and precipitated to form crystals.

The embodiments of the invention in which an exclusive property or privilege is claimed are defined as follows:

1. A process for preparing 3-hydroxy-2-alkyl-4-pyrone, wherein the alkyl is methyl or ethyl, which comprises
(1) reacting
(a) β,δ-dioxoaldehyde dialkylacetal of the formula:

$$RCOCH_2COCH_2CH(OR^1)_2$$

wherein R is methyl or ethyl, and $R^1$ is alkyl of 1 to 4 carbon atoms, with
(b) aryl iodosodicarboxylate of the formula:

$$R^2I(OCOR^3)_2$$

wherein $R^2$ is aryl of 6 to 10 carbon atoms and $R^3$ is hydrogen, alkyl of 1 to 5 carbon atoms or aryl of 6 to 10 carbon atoms;
(2) subjecting the resultant oxidatively acyloxylated product to a ring closing reaction by either
  (a) thermally decomposing same, or
  (b) treating the same with an acid condensing agent; and
(3) hydrolyzing the product of step (2) either subsequently or simultaneously to obtain 3-hydroxy-2-alkyl-4-pyrone.

2. A process according to Claim 1, in which $R^1$ is methyl or ethyl.

3. A process according to Claim 1, in which $R^2$ is selected from the group consisting of phenyl, tolyl and nitrophenyl.

4. A process according to Claim 1, in which $R^3$ is selected from the group consisting of methyl, ethyl and phenyl.

5. A process according to Claim 1, in which step (1) is carried out at a temperature in the range of about 0 to 250° C.

6. A process according to Claim 1, in which step (2)(a) is carried out by heating the oxidatively acyloxylated product to a temperature in the range of about 90° C. to 200° C.

7. A process according to Claim 1, in which step (2)(b) is carried out by contacting the oxidatively acyloxylated product with an acid selected from the group consisting of hydrochloric acid, phosphoric acid, sulfuric acid and organic sulfonic acid at a temperature in the range of 10 to 150° C.

8. A process according to Claim 1 wherein, in step (I), $R^2I$ and an organic peracid are mixed with said $\beta,\delta$-dioxoaldehyde dialkylacetal so that the said aryl iodosodicarboxylate is formed in situ in contact with said $\beta,\delta$-dioxoaldehyde dialkylacetal so that the oxidative acyloxylation reaction (I) occurs concurrently while forming said aryl iodosodicarboxylate.

9. A process according to Claim 8 in which iodobenzene and peracetic acid are reacted in situ to produce the aryl iodosodicarboxylate reagent, phenyl iodosodiacetate.

10. A process according to Claim 8 wherein $R^2I$ produced in step I is separated from the reaction mixture of step I and is recycled to the process.

11. A process according to Claim 1, in which said aryl iodosodicarboxylate is prepared by reacting $R^2I$ and organic peracid in solution to produce a reaction mixture liquor and, in step I, said $\beta,\delta$-dioxoaldehyde dialkylacetal is added to said reaction mixture liquor.

12. A process according to Claim 11, in which $R^2I$ produced in step I is separated from the reaction mixture of step I and is recycled to the step of preparing said aryl iodosodicarboxylate.

References Cited
UNITED STATES PATENTS 3,665,015  5/1972  Takasu et al. _____ 260—345.9

OTHER REFERENCES

Fieser et al.: "Reagents for Organic Synthesis," 1967, pp. 508–509.

HENRY R. JILES, Primary Examiner

M. A. M. CROWDER, Assistant Examiner

U.S. Cl. X.R.
260—483, 496